United States Patent
Hur et al.

(10) Patent No.: US 8,260,890 B1
(45) Date of Patent: Sep. 4, 2012

(54) DUAL STACK MODULE CONTROLLING APPARATUS FOR LOW POWER CONSUMPTION

(75) Inventors: Bongjun Hur, Yongin (KR); Soohwan Kim, Yongin (KR)

(73) Assignee: Wiznet Co., Ltd, Seongnam (KR)

(*) Notice: Subject to any disclaimer, the term of this patent is extended or adjusted under 35 U.S.C. 154(b) by 0 days.

(21) Appl. No.: 13/292,106

(22) Filed: Nov. 9, 2011

(30) Foreign Application Priority Data

Oct. 25, 2011 (KR) .................. 10-2011-0109039

(51) Int. Cl.
*G06F 1/00* (2006.01)
*G06F 1/26* (2006.01)
*G06F 1/32* (2006.01)
*G06F 15/177* (2006.01)

(52) U.S. Cl. .................. 709/220; 713/324; 370/254

(58) Field of Classification Search .................. 713/300, 713/320, 324; 709/220; 370/254
See application file for complete search history.

(56) References Cited

U.S. PATENT DOCUMENTS

| 7,644,154 | B2* | 1/2010 | Tagawa et al. | 709/224 |
| 2004/0004940 | A1* | 1/2004 | Abrol et al. | 370/252 |
| 2010/0309813 | A1* | 12/2010 | Singh et al. | 370/254 |

FOREIGN PATENT DOCUMENTS

| KR | 10-2009-0020683 A | 2/2009 |
| KR | 10-2010-0014197 A | 2/2010 |

* cited by examiner

*Primary Examiner* — Mark Connolly
(74) *Attorney, Agent, or Firm* — Patent Office of Dr. Chung Park

(57) ABSTRACT

A dual stack module controlling apparatus for low power consumption is disclosed. The dual stack module controlling apparatus for low power consumption includes an IP address version determining part to determine an IP address version based on current IP address assignment information transmitted thereto from an IP address control module, and an internet protocol stack controlling part to activate a TCP/UDP stack processor module, an IP stack processor module and an IP packet preprocessor module for processing data of the determined IP address version and to deactivate a TCP/UDP stack processor module, an IP stack processor module and an IP packet preprocessor module for processing data of a different IP address version from the determining IP address version. According to the dual stack module controlling apparatus for low power consumption, one of the IPv4 and IPv6 modules may be activated as necessary.

5 Claims, 2 Drawing Sheets

[FIG. 1]
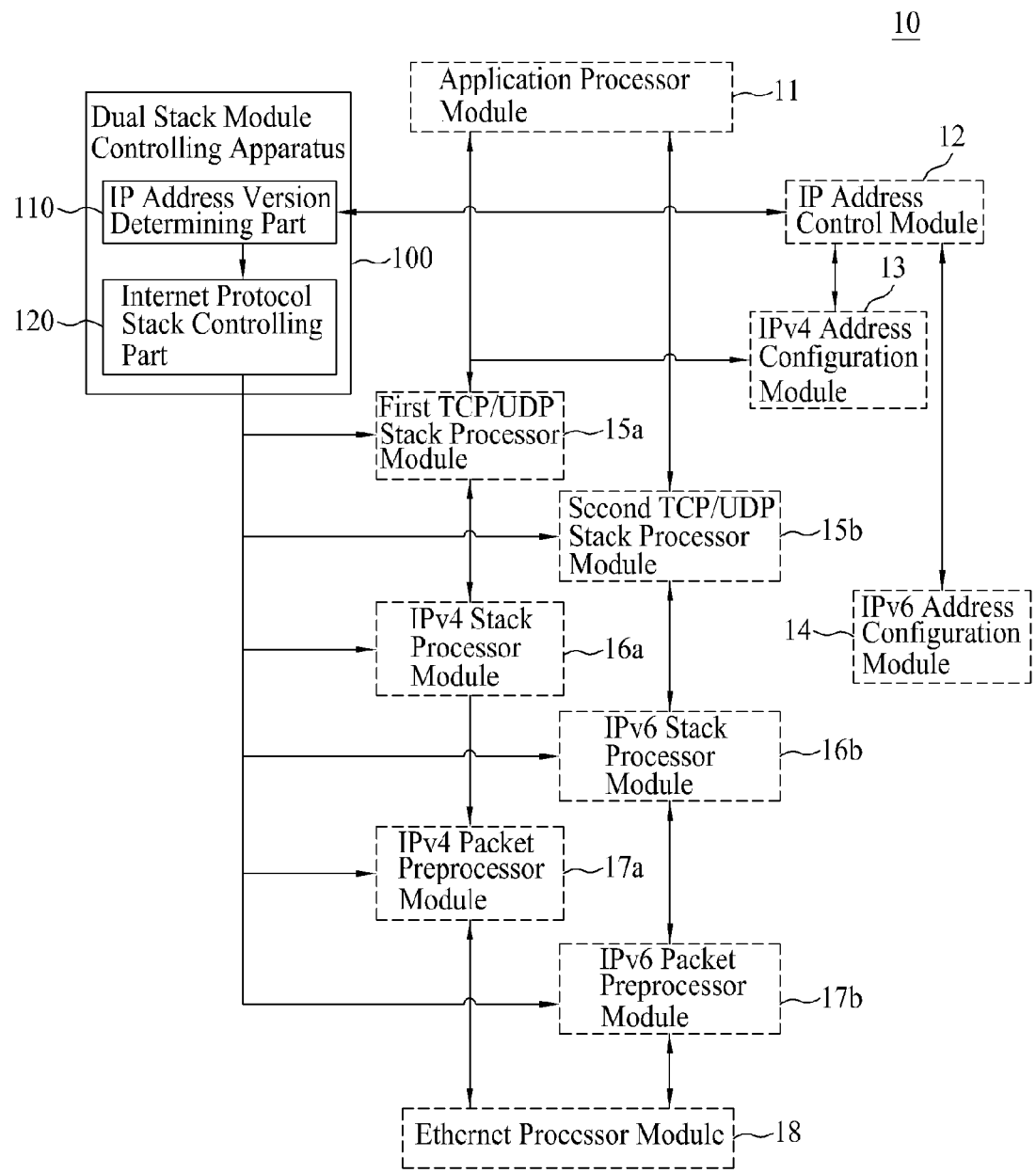

[FIG. 2]
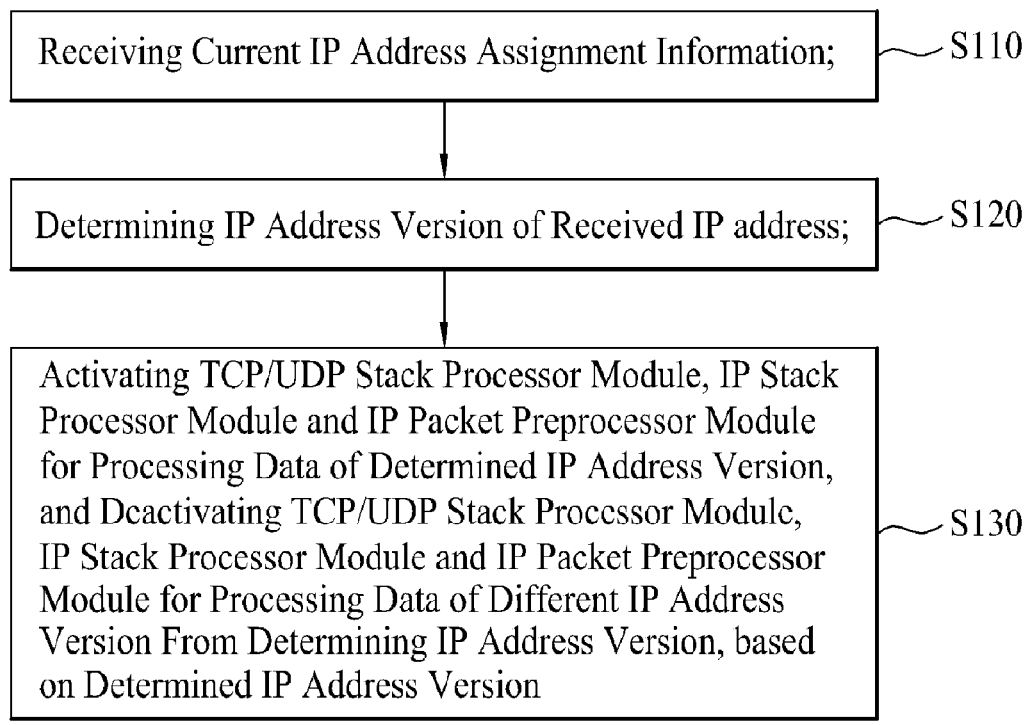

… (US 8,260,890 B1)

DUAL STACK MODULE CONTROLLING APPARATUS FOR LOW POWER CONSUMPTION

CROSS-REFERENCE TO RELATED APPLICATION

This application claims priority under 35 U.S.C. §119 from Korean Application No. 10-2011-0109039 filed on Oct. 25, 2011, the subject matter of which is incorporated herein by reference.

BACKGROUND

1. Field

The present invention relates to a dual stack module controlling apparatus, more particularly, to a dual stack module controlling apparatus for low power consumption.

2. Background

With spread of internet protocol version 6 (IPv6), various communication devices such as a network card is able to process IPv6 data as well as conventional IPv4 (internet protocol version 4) data.

Dual stack, tunneling and header translation have been used for the data processing of IPv4 and IPv6. Out of them, the dual stack may include a stack for processing IPv4 and a stack for processing IPv6.

The IPv4 stack module and the IPv6 stack module may be realized as an embedded system and an embedded device provided in most of the network equipments. In this case, the network equipments cannot help but be enlarged and complex. Because of that, a dual stack apparatus has to be a disadvantage of high power consumption and high resource consumption, compared with a single stack apparatus. The disadvantage will be described.

The dual stack module supports a dual mode and a single mode. The dual mode activates entire stacks for an IPv4 address and an IPv6 address to be assigned to the dual mode. The dual stack module has a disadvantage of activating entire stacks even in an incommunicable status because an IP address fails to be assigned thereto. In the single mode, one of IP version stacks can be selected. However, the stacks having the unselected IP versions have to be controlled appropriately for efficient resource management.

Power consumption may weigh heavily in an apparatus using a limited resource such as a conventional M2M (machine-to-machine) equipment or sensor or an embedded system requiring low power consumption. Also, the dual stack equipments desperately need low power consumption as a base of green technology has been expanded in almost all of technologies.

SUMMARY

Accordingly, the embodiments may be directed to a dual stack module controlling apparatus for low power consumption. To solve the problems, an object of the embodiments may be to provide a dual stack module controlling apparatus with low power consumption.

To achieve these objects and other advantages and in accordance with the purpose of the embodiments, as embodied and broadly described herein, a dual stack module controlling apparatus for low power consumption may include an IP address version determining part to determine an IP address version based on current IP address assignment information transmitted thereto from an IP address control module; and an internet protocol stack controlling part to activate a TCP/UDP stack processor module, an IP stack processor module and an IP packet preprocessor module for processing data of the determined IP address version and to deactivate a TCP/UDP stack processor module, an IP stack processor module and an IP packet preprocessor module for processing data of a different IP address version from the determining IP address version.

In another aspect, a dual stack module controlling method for low power consumption may include receiving a current IP address assignment information; determining an IP address version of the received IP address; and activating a TCP/UDP stack processor module, an IP stack processor module and an IP packet preprocessor module for processing data of the determined IP address version, and deactivating a TCP/UDP stack processor module, an IP stack processor module and an IP packet preprocessor module for processing data of a different IP address version from the determining IP address version, based on the determined IP address version.

The embodiments have following advantageous effects. It is to be understood that both the foregoing general description and the following detailed description of the embodiments or arrangements are exemplary and explanatory and are intended to provide further explanation of the embodiments as claimed.

BRIEF DESCRIPTION OF THE DRAWINGS

Arrangements and embodiments may be described in detail with reference to the following drawings in which like reference numerals refer to like elements and wherein:

FIG. 1 is a block view illustrating a dual stack module controlling apparatus for low power consumption according to an embodiment; and FIG. 2 is a flow chart of a control method for the dual stack module controlling apparatus.

DETAILED DESCRIPTION

The invention may have various variations and various embodiments. Specific embodiments will be explained in the drawings and the detailed description. However, it is to be understood that the invention is not limited in its application to the details of constriction and the arrangement of components set forth in the following description or illustrated in the following drawings. Reference may now be made in detail to specific embodiments, examples of which may be illustrated in the accompanying drawings. Wherever possible, same reference numbers may be used throughout the drawings to refer to the same or like parts.

It will be understood that when an element is referred to with 'first', 'second', 'A' and 'B', the element is not limited by them. They may be used only for a purpose of distinguishing the element from the other elements. For example, a first element may be referred to as a second element not out of the scope of the claims set forth herewith. Similarly, a second element may be referred to as a first element. The user of "and/or" may be meant to include combination of listed items relating thereto or one of the listed items.

It will be understood that when an element is referred to as being 'on' or "under" another element, it can be directly on/under the element, and one or more intervening elements may also be present. When an element is referred to as being 'on' or 'under', 'under the element' as well as 'on the element' can be included based on the element.

The phraseology and terminology used herein are for the purpose of description and should not be regarded as limiting. The use of "including," "comprising," or "having" and variations thereof herein is meant to encompass the items listed thereafter and equivalents thereof as well as additional items. A singular element may encompass plural elements, unless specified or limited otherwise. The use of "including," "comprising," or "having" and variations thereof herein is meant to encompass the characteristics, numbers, steps, operations, elements, component parts or combinations thereof listed thereafter and equivalents thereof as well as additional items, not excluding one or more different characteristics, numbers, steps, operations, elements, component parts or combinations thereof.

Also, it is to be understood that the phraseology and terminology used herein including technological or scientific terminology are same as the phraseology and terminology understood by those skilled in the art in the art the invention pertains to. It is to be understood that the terminology defined in a dictionary used herein is meant to encompass the meaning thereof disclosed in related arts. Unless for the purpose of description and should not be regarded as limiting, the terminology is not meant to be ideal or exaggerated.

As follows, an exemplary embodiment of the prevent invention will be described in detail in reference to the accompanying drawings.

FIG. 1 is a block view illustrating a dual stack module controlling apparatus for low power consumption according to an exemplary embodiment.

In reference to FIG. 1, a dual stack module controlling apparatus 100 for low power consumption according to an exemplary embodiment (hereinafter, referenced to as "dual stack module controlling apparatus") may include an IP address version determining part 110 and an internet protocol stack controlling part 120.

In the meanwhile, a dual stack processing apparatus may include an application module 11, an IP address control module 12, an IPv4 address configuration module 13, an IPv6 address configuration module 14, a first transmission control protocol/user datagram protocol (TCP/UDP) stack processor module 15a, a second TCP/UDP stack processor module 15b, an IPv4 packet preprocessor module 16a, an IPv6 stack processor module 16b, an IPv4 packet preprocessor module 17a, an IPv6 packet preprocessor module 17b and an Ethernet-processor 18.

Here, the dual stack module controlling apparatus 100 for low power consumption may be configured to activate the stack modules of the dual stack processing apparatus 10.

The dual stack module controlling apparatus 100 and the dual stack processing apparatus 10 may be realized as a single system-on-chip (SoC). More specifically, the dual stack module controlling apparatus 100 for low power consumption may be configured to activate and deactivate the modules 15a, 16a and 17a for processing IPv4 data or the modules 15b, 16b and 17b for processing IPv6 data as necessary. Because of that, power consumption of the modules not used currently may be reduced and resources thereof may be managed efficiently. As follows, the component parts mentioned above will be explained in detail.

The IP address version determining part 110 may be provided current IP address assignment information by the IP address control module 12, to determine an IP address version. As follows, the relating operation of the IP address version determining part 110 to the dual stack processing apparatus 10 will be explained.

The IP address control module 12 may set and control the IPv4 address configuration module 13 and the IPv6 address configuration module 14. The IP address control module 12 may transmit currently-configured IP address assignment information to the IP address version determining part 110 based on request of the IP address version determining part 110. Here, the IPv4 address configuration module 13 may automatically configurate an IPv4 address based on dynamic host configuration protocol (DHCP). The IPv6 address configuration module 14 may automatically configurate an IPv6 address. The IPv6 address configuration module 13 may detect whether the application processor module 11 processes the IPv4 data or Ipv6 data and it may automatically configurate an internet protocol address based on the result of the data process. At this time, the application processor module 110 may select IPv4 or Ipv6 based on an IP process capacity of a target node. In other words, the version of the IP address may be determined and configurated based on the selection of the application processor module 11. The IP address version determining part 110 may determine the configurated IP address version.

Next, when the IP address version determined by the IP address version determining part 110 is IPv4, the internet protocol stack controlling part 120 may activate the first ICP/UDP stack processor module 15a, the IPv4 stack processor module 16a and the IPv4 packet preprocessor module 17a and it may deactivate the second TCP/UDP stack processor module 15b, the IPv6 stack processor module and the IPv6 packet preprocessor module 16b. when the IP address version determined by the IP address version determining part 110 is IPv6, the internet protocol stack controlling part 120 may deactivate the first TCP/UDP stack processor module 15a, the IPv4 stack processor module 16a and the IPv4 packet preprocessor module 17a and it may activate the second TCP/UDP stack processor module 15b, the IPv6 stack processor module and the IPv6 packet preprocessor module 16b. Because of that, there may be no resource occupation and power consumption in the modules for processing the IP address version not used currently. As a result, the power consumption may be reduced. As follows, the relating operation to the dual stack processing apparatus 10 will be described.

The application processor module 11 may transmit data to the first TCP/UDP stack processor module 15a and the second TCP/UDP stack processor module 15b. The application processor module 11 may receive data from one of the activated modules and it may perform TCP/UDP processing.

The activated one of the IPv4 stack processor module 15a or the IPv6 stack processor module 16b performs IP processing, to transmit the data to the IPv4 pack preprocessor module 17a or the Ipv6 packet preprocessor module 17b. The IPv4 packet preprocessor module 17a or the IPv6 packet preprocessor module 17b may perform packet filtering.

The Ethernet processor module 18 may convert the packet-filtered data into an electronic signal and it may transmit the electronic signal over a network.

A data receiving procedure may be performed in the reverse of the data transmission procedure mentioned above.

FIG. 2 is a flow chart illustrating a dual stack module controlling method for low power consumption according to an embodiment of the present invention.

In reference to FIG. 2, the IP address version determining part 110 may receive current IP assignment information from the IP address control module 12 (S110). Here, the IP address assignment may be performed by the IPv4 address configuration module 13 and the IPv6 address configuration module 14. Only of the IPv4 address configuration module 13 and the IPv6 address configuration module 14 may be perform the IP address assignment based on the information provided by the application processor module 11. The application processor module 11 may determine the IP information based on an IP address of the target node transmitted from a domain name server (DNS).

Hence, the IP address version determining part 110 may determine the IP address version transmitted thereto (S120). The IP address version determining part 110 may assign a 32 bit IP address for the IPv4 and it may assign 128-bit address for the IPv6.

After that, the internet protocol stack controlling part 120 may activate the modules for processing corresponding IP version data based on the determined IP address version and it may deactivate the modules for processing different IP address version data from the corresponding IP address version data (S130). In other words, when the IP address version is IPv4, the internet protocol stack controlling part 120 may activate the first TCP/UDP stack processor module 15*a*, the IPv4 stack processor module 16*a* and the IPv4 packet preprocessor module 17*a* and it may deactivate the second TCP/UDP stack processor module 15*b*, the IPv6 stack processor module 16*b* and the IPv6 packet preprocessor module 17*b*. similarly, when the IP address version is IPv6, the internet protocol stack controlling part 120 may deactivate the first TCP/UDP stack processor module 15*a*, the IPv4 stack processor module 16*a* and the IPv4 packet preprocessor module 17*a* and it may activate the second TCP/UDP stack processor module 15*b*, the IPv6 stack processor module 16*b* and the IPv6 packet preprocessor module 17*b*.

What is claimed is:

1. A dual stack module controlling apparatus for low power consumption comprising:
    an IP address version determining part to determine an IP address version based on current IP address assignment information transmitted thereto from an IP address control module; and
    an internet protocol stack controlling part to activate a TCP/UDP stack processor module, an IP stack processor module and an IP packet preprocessor module for processing data of the determined IP address version and to deactivate a TCP/UDP stack processor module, an IP stack processor module and an IP packet preprocessor module for processing data of a different IP address version from the determining IP address version.

2. The dual stack module controlling apparatus for low power consumption according to claim 1, wherein the IP address version is IPv4 or IPv6.

3. The dual stack module controlling apparatus for low power consumption according to claim 2, wherein the dual stack module controlling apparatus is realized to be a system-on-chip (SoC), together with the IP address control module, the TCP/UDP stack processor module, the IP stack processor module and the IP packet preprocessor module.

4. A dual stack module controlling method for low power consumption comprising:
    receiving current IP address assignment information;
    determining an IP address version of the received IP address; and
    activating a TCP/UDP stack processor module, an IP stack processor module and an IP packet preprocessor module for processing data of the determined IP address version, and deactivating a TCP/UDP stack processor module, an IP stack processor module and an IP packet preprocessor module for processing data of a different IP address version from the determining IP address version, based on the determined IP address version.

5. The dual stack module controlling method for low power consumption according to claim 4, wherein the IP address version is IPv4 or IPv6.

* * * * *